United States Patent
Tian et al.

(10) Patent No.: US 11,960,327 B2
(45) Date of Patent: Apr. 16, 2024

(54) DISPLAY CONTROL METHOD FOR ELECTRONIC DEVICE WITH FOLDABLE SCREEN AND ELECTRONIC DEVICE

(71) Applicant: HUAWEI TECHNOLOGIES CO., LTD., Guangdong (CN)

(72) Inventors: Huajian Tian, Lima (PE); Xiaoxiao Chen, Nanjing (CN); Wancheng Hu, Wuhan (CN); Jing Cheng, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 63 days.

(21) Appl. No.: 17/764,591

(22) PCT Filed: Sep. 28, 2020

(86) PCT No.: PCT/CN2020/118403
§ 371 (c)(1),
(2) Date: Mar. 29, 2022

(87) PCT Pub. No.: WO2021/063311
PCT Pub. Date: Apr. 8, 2021

(65) Prior Publication Data
US 2022/0350374 A1    Nov. 3, 2022

(30) Foreign Application Priority Data
Sep. 30, 2019  (CN) .......................... 201910944731.4

(51) Int. Cl.
*G06F 1/16*    (2006.01)
*G06F 21/84*   (2013.01)

(52) U.S. Cl.
CPC ............ *G06F 1/1677* (2013.01); *G06F 21/84* (2013.01); *G06F 2221/2149* (2013.01)

(58) Field of Classification Search
CPC .......................... G06F 3/04883; G06F 3/0338
See application file for complete search history.

(56) References Cited

U.S. PATENT DOCUMENTS

| | | | |
|---|---|---|---|
| 9,575,629 B1 | 2/2017 | Hansen et al. | |
| 11,281,814 B2 * | 3/2022 | He | G06F 21/6245 |

(Continued)

FOREIGN PATENT DOCUMENTS

| | | | |
|---|---|---|---|
| CN | 105979098 A | 9/2016 | |
| CN | 106453825 A | 2/2017 | |

(Continued)

OTHER PUBLICATIONS

International Search Report and Written Opinion issued in PCT/CN2020/118403, dated Jan. 4, 2021, 10 pages.

(Continued)

*Primary Examiner* — Doon Y Chow

(57) ABSTRACT

The display control method for an electronic device with a foldable screen according to an embodiment of this application includes: The electronic device determines a first use posture of using the electronic device by a user, and locks a first screen in response to the first use posture; and when detecting a photographing scenario of a camera and a flip operation performed by the user of the electronic device, the electronic device detects whether an object approaches the electronic device, and in response to a detection result, switches from performing displaying on the first screen to performing displaying on a second screen, or maintains the first screen on and the second screen off. In embodiments of this application, intelligent screen locking or automatic screen switching can be implemented based on different application scenarios, to implement an intelligent terminal device, and improve use performance of the terminal device.

13 Claims, 9 Drawing Sheets

(56) References Cited

U.S. PATENT DOCUMENTS

| | | | |
|---|---|---|---|
| 11,616,869 B2* | 3/2023 | Lee | H04M 1/0214 |
| | | | 455/575.3 |
| 2013/0027364 A1* | 1/2013 | Kim | G06F 1/1647 |
| | | | 345/204 |
| 2013/0076597 A1* | 3/2013 | Becze | G06F 9/451 |
| | | | 345/1.3 |
| 2014/0101578 A1* | 4/2014 | Kwak | G06F 3/017 |
| | | | 715/761 |
| 2015/0153778 A1* | 6/2015 | Jung | G06F 1/1677 |
| | | | 345/156 |
| 2016/0132074 A1* | 5/2016 | Kim | G06F 1/1652 |
| | | | 345/173 |
| 2018/0198987 A1* | 7/2018 | Park | H04N 23/63 |
| 2019/0155561 A1 | 5/2019 | Reeves et al. | |

FOREIGN PATENT DOCUMENTS

| | | |
|---|---|---|
| CN | 106484351 A | 3/2017 |
| CN | 106774671 A | 5/2017 |
| CN | 106973170 A | 7/2017 |
| CN | 107340958 A | 11/2017 |
| CN | 108008889 A | 5/2018 |
| CN | 109510937 A | 3/2019 |
| CN | 109782944 A | 5/2019 |
| CN | 109840061 A | 6/2019 |
| CN | 109889630 * | 6/2019 |
| CN | 109889630 A | 6/2019 |
| CN | 109976688 A | 7/2019 |
| CN | 110798568 A | 2/2020 |
| KR | 20160092877 A | 8/2016 |
| WO | 2019029194 A1 | 2/2019 |

OTHER PUBLICATIONS

European Search Report issued in EP20873296.6, dated Oct. 18, 2022, 13 pages.
Office Action issued in CN201910944731.4, dated Jun. 3, 2020, 10 pages.
Office Action issued in CN201910944731.4, dated Jan. 29, 2021, 9 pages.
Extended European Search Report issued in EP20873296.6, dated Jan. 31, 2023, 14 pages.

* cited by examiner

DISPLAY CONTROL METHOD FOR ELECTRONIC DEVICE WITH FOLDABLE SCREEN AND ELECTRONIC DEVICE

CROSS-REFERENCE TO RELATED APPLICATIONS

This application is a national stage of International Application No. PCT/CN2020/118403, filed on Sep. 28, 2020, which claims priority to Chinese Patent Application No. 201910944731.4, filed on Sep. 30, 2019. Both of the aforementioned applications are hereby incorporated by reference in their entireties.

TECHNICAL FIELD

Embodiments of this application relate to electronic device technologies, and in particular, to a display control method for an electronic device with a foldable screen and an electronic device with a foldable screen.

BACKGROUND

With the continuous development of communication technologies, electronic devices such as mobile phones have become an indispensable part of people's daily life. By using a mobile phone, a user can not only communicate with another user, but also browse or process various information. With the development of the current flexible screen technologies, dual-screen or multi-screen foldable mobile phones go into people's life as a new form of mobile phones.

The user can switch between large and small screens by expanding or folding a screen. The mobile phone in a folded state may identify a user-facing screen, use the user-facing screen as a display, and receive an operation instruction of the user on the display.

However, the foregoing manner of determining the display is too simple to meet use requirements of the user in different usage scenarios.

SUMMARY

Embodiments of this application provide a display control method for an electronic device with a foldable screen and an electronic device with a foldable screen, to intelligently lock a screen or automatically switch the screen based on different application scenarios, so as to meet use requirements of a user in different usage scenarios.

According to a first aspect, embodiments of this application provide a display control method for an electronic device with a foldable screen, where the electronic device is in a folded state, a first screen of the electronic device is on, and a second screen of the electronic device is off. The method may include: The electronic device determines a first use posture of using the electronic device by a user; the electronic device locks the first screen in response to the first use gesture; or when detecting a photographing scenario of a camera and a flip operation performed by the user on the electronic device, the electronic device detects whether an object approaches the electronic device, and in response to a detection result, switches from performing displaying on the first screen to performing displaying on the second screen, or maintains the first screen on and the second screen off.

The application scenario in which the user uses the electronic device in the folded state may include: The user uses the electronic device in the folded state in a lying posture, or uses the electronic device in the folded state when the user changes from the lying posture to a standing posture, or the user uses the electronic device in the folded state to take a selfie, or the user uses the electronic device in the folded state to perform a QR code payment, scan a code to add a friend, or the like.

In this implementation, the electronic device may intelligently identify an application scenario of the electronic device, and perform automatic screen switching or locking based on a use requirement of the application scenario, to implement an intelligent terminal device and improve use performance of the terminal device.

In an example embodiment, that the electronic device determines a first use posture of using the electronic device by a user may include: The electronic device detects an elevation angle of the electronic device in the folded state, where the elevation angle is an included angle between the first screen and a vertical direction. The electronic device determines, based on the elevation angle, the first use posture of using the electronic device by the user.

In this implementation, the electronic device detects the elevation angle of the electronic device in the folded state, determines, based on the elevation angle of the electronic device, the first use posture of using the electronic device by the user, and performs the screen locking in response to the first use posture of the foldable screen, to identify the application scenario (the user uses the electronic device in embodiments of this application in the lying posture) and perform intelligent screen locking. This avoids incorrect switching of the two screens.

In an example embodiment, that the electronic device determines, based on the elevation angle, the first use posture of using the electronic device by the user may include: The electronic device determines, when detecting that the elevation angle falls within a first preset range, the first use posture of using the electronic device by the user, where the first preset range includes 20° to 70°, and the elevation angle is an included angle between a direction perpendicular to the first screen and the vertical direction.

For example, when the camera of the electronic device is disabled, the electronic device determines a use posture of the foldable screen of the electronic device based on the elevation angle.

For example, when the user uses the electronic device in embodiments of this application in the lying posture, the electronic device in embodiments of this application can avoid incorrect switching of the two screens by using the foregoing method.

In an example embodiment, that the electronic device determines, when detecting that the elevation angle falls within a first preset range, the first use posture of using the electronic device by the user may include: When detecting that the elevation angle falls within the first preset range in a first preset time period, the electronic device determines the first usage status of using the electronic device by the user.

In an example embodiment, the method may further include: The electronic device determines a second use posture of using the electronic device by the user, and in response to the second use posture, switches from performing displaying on the first screen to performing displaying on the second screen.

In this implementation, the electronic device detects the elevation angle of the electronic device in the folded state, determines, based on the elevation angle of the electronic device, the second use posture of using the electronic device by the user, and performs the screen switching in response to the second use posture of the folded screen, to implement automatic screen switching.

In an example embodiment, that the electronic device detects whether an object approaches the electronic device, and in response to a detection result, switches from performing displaying on the first screen to performing displaying on the second screen, or maintains the first screen on and the second screen off may include: When detecting that an object approaches the electronic device, the electronic device maintains the first screen on and the second screen off; and when detecting that no object approaches the electronic device, the electronic device switches from performing displaying on the first screen to performing displaying on the second screen.

In this implementation, when detecting the photographing scenario of the camera and the flip operation performed by the user on the electronic device, the electronic device detects whether an object approaches the electronic device, and performs the screen switching or maintains the current displaying based on the detection result, so that the electronic device intelligently identifies the application scenario of the electronic device, and performs or does not perform the automatic screen switching based on the use requirement of the application scenario. This implements an intelligent terminal device and improves use performance of the terminal device.

When the camera of the electronic device is enabled, the electronic device may determine a usage status of the foldable screen of the electronic device based on a flip angle and an optical proximity event, and perform the screen switching based on the usage status of the foldable screen. For example, if it is determined that the application scenario of the electronic device is a selfie scenario, the electronic device may automatically perform the screen switching based on a use requirement of the selfie scenario. For example, if it is determined that the application scenario of the electronic device is a code scanning scenario, the electronic device may maintain display statuses of the two screens based on a use requirement of the code scanning scenario.

In an example embodiment, the method may further include: The electronic device detects a flip angle of the electronic device, and when the flip angle is greater than a flip threshold, the electronic device detects whether an object approaches the electronic device.

In an example embodiment, that the electronic device detects whether an object approaches the electronic device may include: The electronic device detects, in a second preset time period, whether an object approaches the electronic device.

According to a second aspect, embodiments of this application provide an apparatus. The apparatus has a function of implementing the actions of the electronic device in the method according to the first aspect. The function may be implemented by hardware, or may be implemented by hardware executing corresponding software. The hardware or software includes one or more modules corresponding to the function, for example, a determining unit or module, a storage unit or module, a division unit or module, and a display unit or module.

According to a third aspect, embodiments of this application provide an electronic device, where the electronic device includes one or more processors, a memory, and a foldable screen. The foldable screen includes at least a first screen and a second screen, configured to display content according to instructions of the one or more processors. The memory is configured to store one or more programs. The one or more processors are configured to run the one or more programs to implement the following actions: determining a first use posture of using the electronic device by a user, and locking the first screen in response to the first use posture; or when detecting a photographing scenario of a camera and a flip operation performed by the user on the electronic device, detecting whether an object approaches the electronic device, and in response to a detection result, switching from performing displaying on the first screen to performing displaying on the second screen, or maintaining the first screen on and the second screen off.

In an example embodiment, the determining a first use posture of using the electronic device by the user may include: detecting an elevation angle of the electronic device in a folded state, where the elevation angle is an included angle between the first screen and a vertical direction; and determining, based on the elevation angle, the first use posture of using the electronic device by the user.

In an example embodiment, the determining, based on the elevation angle, the first use posture of using the electronic device by the user may include: determining, when detecting that the elevation angle falls within a first preset range, the first use posture of using the electronic device by the user, where the first preset range includes 20° to 70°, and the elevation angle is an included angle between a direction perpendicular to the first screen and the vertical direction.

In an example embodiment, the determining, when detecting that the elevation angle falls within a first preset range, the first use posture of using the electronic device by the user may include: when detecting that the elevation angle falls within the first preset range in a first preset time period, determining the first usage status of using the electronic device by the user.

In an example embodiment, the following actions are further implemented: determining a second use posture of using the electronic device by the user, and in response to the second use posture, switching from performing displaying on the first screen to performing displaying on the second screen.

In an example embodiment, the detecting whether an object approaches the electronic device, and in response to a detection result, switching from performing displaying on the first screen to performing displaying on the second screen, or maintaining the first screen on and the second screen off may include: when detecting that an object approaches the electronic device, maintaining the first screen on and the second screen off; and when detecting that no object approaches the electronic device, switching from performing displaying on the first screen to performing displaying on the second screen.

In an example embodiment, the following actions are further implemented: detecting a flip angle of the electronic device, and when the flip angle is greater than a flip threshold, detecting whether an object approaches the electronic device.

In an example embodiment, the detecting whether an object approaches the electronic device may include: detecting, in a second preset time period, whether an object approaches the electronic device.

According to a fourth aspect, embodiments of this application provide an electronic device, where the electronic device includes one or more processors, a memory, and a foldable screen. The foldable screen includes at least a first screen and a second screen. A sensor is disposed on the first screen, and is configured to measure at least one of an elevation angle or a flip angle of the first screen. A sensor is disposed on the second screen, and is configured to measure at least one of an elevation angle or a flip angle of the second screen. The memory stores one or more computer programs, and the one or more processors are configured to execute the one or more computer programs. The one or more computer programs include instructions, and the instructions are used to perform the display control method for an electronic device with a foldable screen according to any embodiment of the first aspect.

According to a fifth aspect, embodiments of this application provide a computer storage medium, including computer instructions. When the computer instructions are run on an electronic device, the electronic device is enabled to perform the display control method for an electronic device with a foldable screen according to any embodiment of the first aspect.

According to a sixth aspect, embodiments of this application provide a computer program product. When the computer program product runs on a computer, the computer is enabled to perform the display control method for an electronic device with a foldable screen according to any embodiment of the first aspect.

According to a seventh aspect, embodiments of this application provide a chip, including a processor and a memory, where the memory is configured to store a computer program, and the processor is configured to invoke and run the computer program stored in the memory, to perform the method according to any embodiment of the first aspect.

According to the display control method for an electronic device with a foldable screen and the electronic device in embodiments of this application, the usage status of the foldable screen of the electronic device is determined, where the usage status is generated in an application scenario in which the user uses the electronic device in the folded state. The electronic device executes a target event in response to the usage status, where the target event includes screen locking or screen switching, so that the electronic device determines to perform the screen locking or screen switching based on the usage status of the foldable screen of the electronic device, to implement intelligent screen locking or automatic screen switching based on different application scenarios. This implements an intelligent terminal device, and improves use performance of the terminal device.

DESCRIPTION OF EMBODIMENTS

In the present disclosure, the terms "first", "second" and the like are only used for a purpose of description, and cannot be understood as indicating or implying relative importance or a sequence. Moreover, the terms "include", "have", and any other variant thereof are intended to cover a non-exclusive inclusion, for example, including a series of steps or units. Methods, systems, products, or devices are not necessarily limited to those explicitly listed steps or units, but may include other steps or units that are not explicitly listed or that are inherent to such processes, methods, products, or devices. In the descriptions of embodiments of this application, the word such as "example" or "for example" is used to represent giving an example, an illustration, or a description. Any embodiment or design scheme described as the word "example" or "for example" in embodiments of this application should not be explained as being more preferable or having more advantages than another embodiment or design scheme. Exactly, use of the word such as "example" or "for example" is intended to present a related concept in a specific manner.

It should be understood that, in embodiments of this application, "at least one" means one or more, and "a plurality of" means two or more. The term "and/or" is used to describe an association relationship between associated objects, and indicates that three relationships may exist. For example, "A and/or B" may indicate the following three cases: Only A exists, only B exists, and both A and B exist, where A and B may be singular or plural. The character "I" generally indicates an "or" relationship between the associated objects. "At least one of the following" or a similar expression thereof indicates any combination of the following, including any combination of one or more of the following. For example, at least one of a, b, or c may indicate a, b, c, a and b, a and c, b and c, or a, b, and c, where a, b, and c may be singular or plural.

Embodiments of this application provide a display control method for an electronic device with a foldable screen. The method may be performed by the electronic device including the foldable screen. In embodiments of this application, the electronic device including the foldable screen may be referred to as a foldable electronic device. The foldable screen is a display that is foldable.

In some embodiments of this application, the foldable screen may be a flexible foldable screen, and the flexible foldable screen may be folded along a folding edge to form a plurality of (two or more) screens.

Figure 1A:
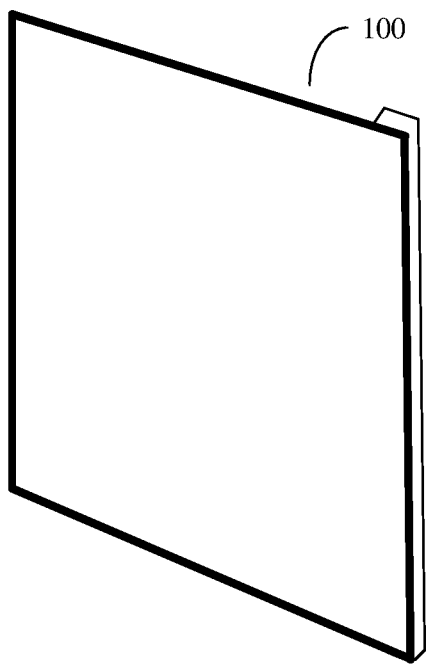
FIG. 1(a) to FIG. 1(c) are schematic diagrams of an electronic device according to an embodiment of this application.
Figure 1B:
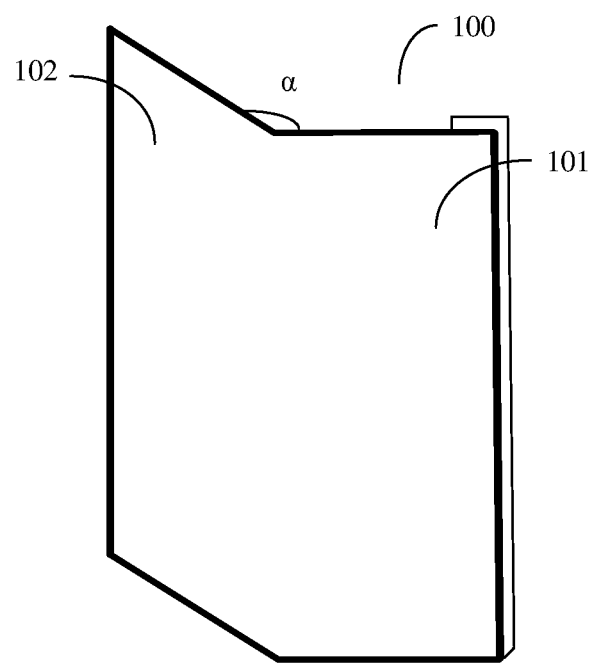
Figure 1C:
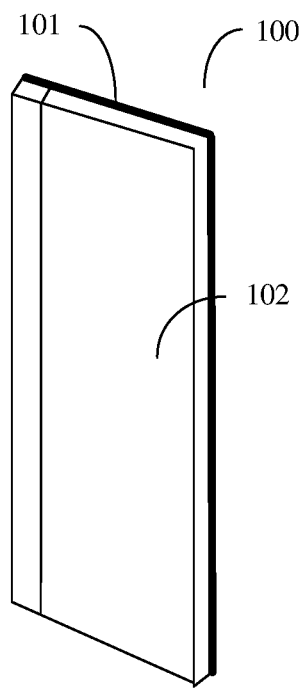

For example, after a flexible foldable screen 100 shown in FIG. 1(a) is folded along a folding edge, a screen A 101 and a screen B 102 shown in FIG. 1(b) may be formed. FIG. 1(c) is a schematic diagram of a form of the flexible foldable screen that is completely folded. FIG. 1(a) is a schematic diagram of a form when the flexible foldable screen is not folded (which may also be referred to as expand), and FIG. 1(b) is a schematic diagram of a form after the flexible foldable screen is folded (or semi-folded). After the flexible foldable screen is completely folded, an included angle α between the screen A and the screen B is 0°. When the foldable screen is not folded, the included angle between the adjacent screens is 180°. For example, the included angle α between the screen A 101 and the screen B 102 shown in FIG. 1(a) is 180°. After the foldable screen is folded, a value range of the included angle between the adjacent screens may be [0°180°). For example, the included angle α between the screen A 101 and the screen B 102 shown in FIG. 1(b) belongs to (0°, 180°). FIG. 1(c) is the schematic diagram of the form of the flexible foldable screen that is completely folded. For example, sizes of the screen A 101 and the screen B 102 are different. For example, the size of the screen A 101 is greater than the size of the screen B 102, a support part configured to carry a camera of an electronic device with the flexible foldable screen may be disposed on the back of the screen A 101, and a sum of a size of the support part and the size of the screen B is equal to or less than the size of the screen A.

In some other embodiments of this application, the foldable screen may be a multi-screen foldable screen. The multi-screen foldable screen may include a plurality of (two or more) screens. The plurality of screens may be sequentially connected by using a folding shaft. Each screen may rotate around a folding shaft connected to the screen, to implement folding of the multi-screen foldable screen.

Figure 2A:
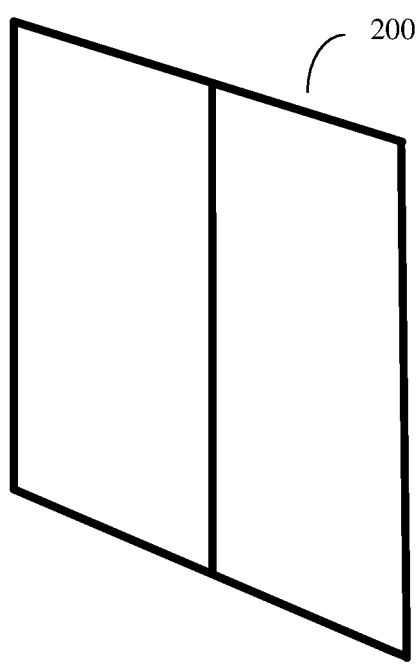
FIG. 2(a) to FIG. 2(c) are schematic diagrams of another electronic device according to an embodiment of this application.
Figure 2B:
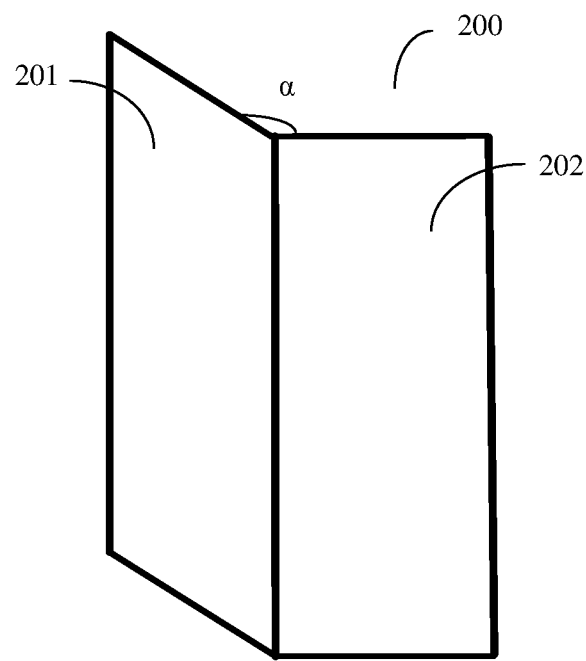
Figure 2C:
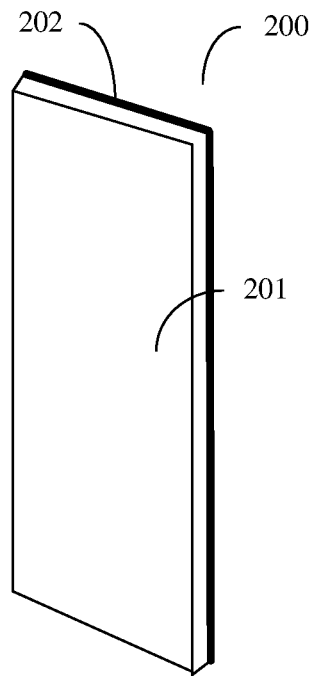

For example, as shown in FIG. 2(a), a multi-screen foldable screen 200 includes two screens, which are referred to as a screen A 201 and a screen B 202. The screen A 201 and the screen B 202 are connected by using a folding shaft, and may rotate around the folding shaft, to implement folding of a multi-screen foldable screen. For example, after the screen A 201 and/or the screen B 202 rotate/rotates around the folding shaft, a multi-screen foldable screen shown in FIG. 2(b) and a multi-screen foldable screen shown in FIG. 2(c) may be formed. FIG. 2(a) is a schematic diagram of a form of the multi-screen foldable screen that is not folded. FIG. 2(b) is a schematic diagram of a form of the multi-screen foldable screen that is semi-folded. FIG. 2(c) is a schematic diagram of a form of the multi-screen foldable screen that is completely folded. A multi-screen foldable screen may also include three or more screens. For a specific form and a folding manner of the multi-screen foldable screen, refer to FIG. 2(a) to FIG. 2(c) and related descriptions.

When the foldable screen is not folded, an included angle α between the screen A 201 and the screen B 202 shown in FIG. 2(a) is 180°. After the foldable screen is folded, a value range of the included angle between the adjacent screens may be [0°, 180°). For example, the included angle α between the screen A 201 and the screen B 202 shown in FIG. 2(b) belongs to (0°, 180°); and the included angle α between the screen A 201 and the screen B 202 shown in FIG. 2(c) is 0°.

In FIG. 1(a) to FIG. 1(c) and FIG. 2(a) to FIG. 2(c), the foldable screen of the electronic device is folded longitudinally to implement folding of the foldable screen. Certainly, the foldable screen of the electronic device may also be folded horizontally, to implement the folding of the foldable screen.

In this embodiment, after the foldable screen is folded, the value range of the included angle between the adjacent screens may be [0°, 180°). A status of the foldable screen is divided based on the included angle between the adjacent screens: A status of the foldable screen in which the included angle between the adjacent screens falls within a value range [0°, 20°] is referred to as a folded state, and a status of the foldable screen in which the included angle between the adjacent screens falls within a value range (20°, 180°) is referred to as a support state.

For example, the electronic device described in embodiments of this application may be a mobile phone, a tablet computer, a desktop computer, a laptop computer, a handheld computer, a notebook computer, an ultra-mobile personal computer, a netbook, and a device including a foldable screen, such as a cellular phone, a personal digital assistant (PDA), an augmented reality (AR)/virtual reality (VR) device, a media player. A specific form of the device is not specifically limited in embodiments of this application.

The following describes implementations of embodiments of this application in detail with reference to the accompanying drawings.

Figure 3:
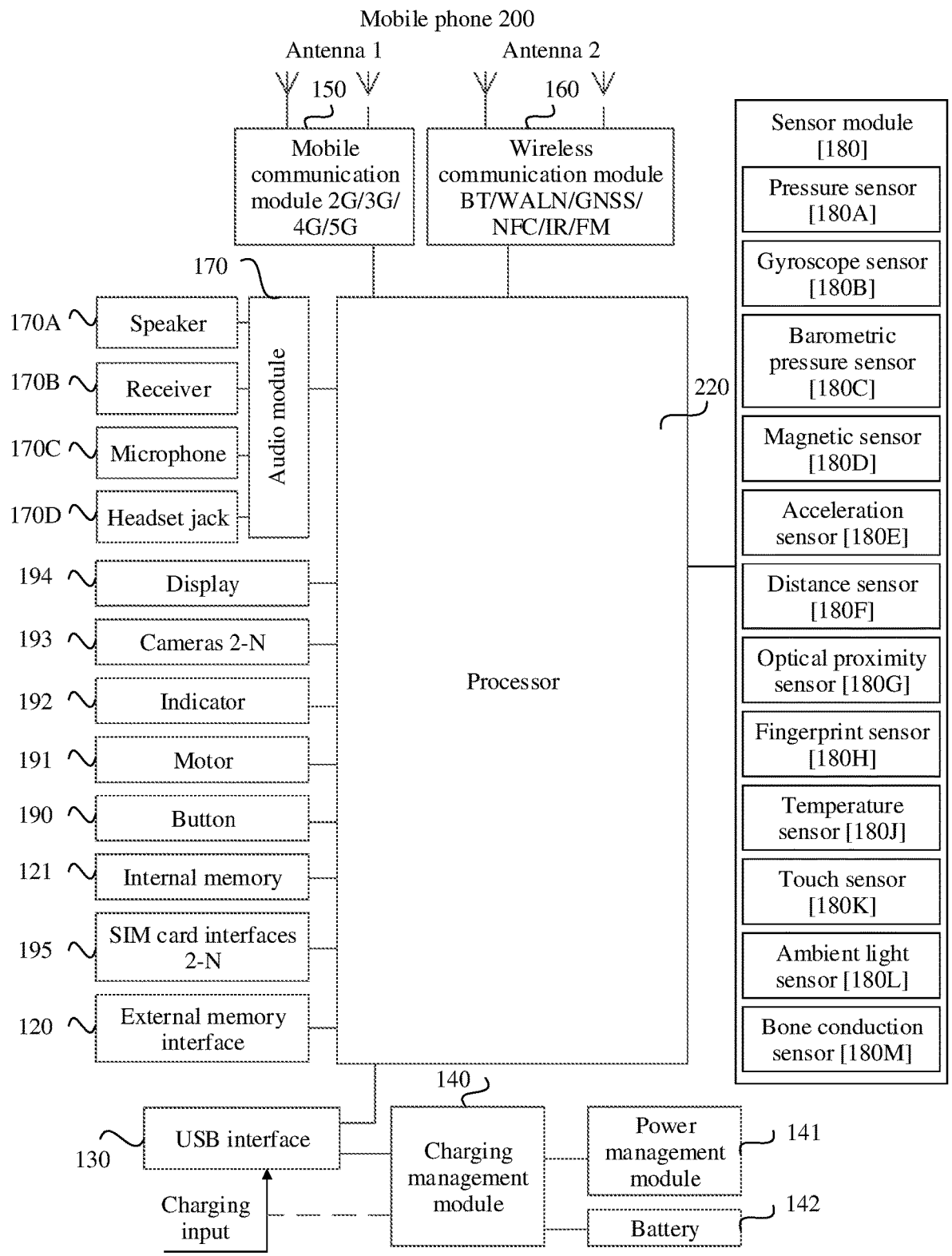
FIG. 3 is a schematic diagram of a structure of an electronic device according to an embodiment of this application.

FIG. 3 is a schematic diagram of a structure of an electronic device according to an embodiment of this application. As shown in FIG. 3, the electronic device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that the structure shown in embodiments of the present invention does not constitute a specific limitation on the electronic device. In other embodiments of this application, the electronic device may include more or fewer components than those shown in the figure, or some components may be combined, or some components may be split, or there may be a different component layout. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent components, or may be integrated into one or more processors.

The controller may be a nerve center and a command center of the electronic device. The controller may generate an operation control signal based on instruction operation code and a time sequence signal, to complete control of instruction reading and instruction execution.

A memory may further be disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor 110 may directly invoke the instructions or the data from the memory. This avoids repeated access and reduces waiting time of the processor 110, so that system efficiency is improved.

In some embodiments, the processor 110 may include one or more interfaces. The interface may include an inter-integrated circuit (I2C) interface, an inter-integrated circuit sound I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronization serial bus, and includes a serial data line (SDA) and a serial clock line (SCL). In some embodiments, the processor 110 may include a plurality of groups of I2C buses. The processor 110 may be separately coupled to the touch sensor 180K, a charger, a flash light, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call by using a Bluetooth headset.

The PCM interface may also be configured to: perform audio communication, and sample, quantize, and code an analog signal. In some embodiments, the audio module 170 may be coupled to the wireless communication module 160 through a PCM bus interface. In some embodiments, the audio module 170 may transmit an audio signal to the wireless communication module 160 through the PCM interface, to implement a function of answering a call by using a Bluetooth headset. Both the I2S interface and the PCM interface may be configured to perform audio communication.

The UART interface is a universal serial data bus, and is configured to perform asynchronous communication. The bus may be a two-way communication bus, and converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music by using a Bluetooth headset.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the camera 193 through the CSI interface, to implement a photographing function of the electronic device. The processor 110 communicates with the display 194 through the DSI interface, to implement a display function of the electronic device.

The GPIO interface may be configured by using software. The GPIO interface may be configured as a control signal or a data signal. In some embodiments, the GPIO interface may be configured to connect the processor 110 to the camera 193, the display 194, the wireless communication module 160, the audio module 170, the sensor module 180, and the like. The GPIO interface may alternatively be configured as the I2C interface, the I2S interface, the UART interface, the MIPI interface, or the like.

The USB interface 130 is an interface that conforms to a USB standard specification, and may be specifically a mini USB interface, a micro USB interface, a USB Type C interface, or the like. The USB interface 130 may be configured to connect to a charger to charge the electronic device, or may be configured to transmit data between the electronic device and a peripheral device, or may be configured to connect to a headset to play audio by using the headset. Alternatively, the interface may be configured to connect to another electronic device, for example, an AR device.

It may be understood that an interface connection relationship between modules illustrated in embodiments is merely an example for description, and does not constitute a limitation on the structure of the electronic device. In other embodiments, the electronic device may alternatively use different interface connection manners in the foregoing embodiments, or a combination of a plurality of interface connection manners.

The charging management module 140 is configured to receive a charging input from a charger. The charger may be a wireless charger or a wired charger. In some embodiments of wired charging, the charging management module 140 may receive a charging input from the wired charger through the USB interface 130. In some embodiments of wireless charging, the charging management module 140 may receive a wireless charging input through a wireless charging coil of the electronic device. The charging management module 140 may further supply power to the electronic device by using the power management module 141 while charging the battery 142.

The power management module 141 is configured to connect to the battery 142, the charging management module 140, and the processor 110. The power management module 141 receives an input from the battery 142 and/or the charging management module 140, and supplies power to the processor 110, the internal memory 121, the external memory, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device may be implemented through the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna of the electronic device may be configured to cover one or more communication frequency bands. Different antennas may further be multiplexed, to improve antenna utilization. For example, the antenna 1 may be multiplexed as a diversity antenna in a wireless local area network. In other embodiments, the antenna may be used in combination with a tuning switch.

The mobile communication module 150 may provide a solution that is for wireless communication including 2G/3G/4G/5G and the like and that is used in the electronic device. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit a processed electromagnetic wave to the modem processor for demodulation. The mobile communication module 150 may further amplify a signal modulated by the modem processor, and convert, through the antenna 1, an amplified signal into an electromagnetic wave for radiation. In some embodiments, at least some functional modules in the mobile communication module 150 may be disposed in the processor 110. In some embodiments, at least some functional modules in the mobile communication module 150 may be disposed in a same device as at least some modules in the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor, and then transmitted to the application processor. The application processor outputs a sound signal through an audio device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in a same device as the mobile communication module 150 or another functional module.

The wireless communication module 160 may provide a wireless communication solution that includes wireless local area networks (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like and that is used in the electronic device. The wireless communication module 160 may be one or more components integrated into at least one communication processor module. The wireless communication module 160 receives an electromagnetic wave through the antenna 2, performs processing such as filtering or amplification on an electromagnetic wave signal, and sends a processed signal to the processor 110. The wireless communication module 160 may further receive a to-be-sent signal from the processor 110, perform frequency modulation and amplification on the signal, and convert, through the antenna 2, a processed signal into an electromagnetic wave for radiation.

In some embodiments, the antenna 1 of the electronic device is coupled to the mobile communication module 150, and the antenna 2 is coupled to the wireless communication module 160, so that the electronic device can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-CDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device implements a display function by using the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs that execute program instructions to generate or change display information.

The display 194 is configured to display an image, a video, and the like. The display 194 is the foldable screen (for example, a flexible foldable screen or a multi-screen foldable screen). The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, quantum dot light emitting diodes (QLED), or the like.

The electronic device may implement a photographing function through the ISP, the camera 193, the video codec, the GPU, the display 194, the application processor, and the like.

The ISP is configured to process data fed back by the camera 193. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as an RGB format or a YUV format. In some embodiments, the electronic device may include one or N cameras 193, where N is a positive integer greater than 1.

The digital signal processor is configured to process a digital signal, and may process another digital signal in addition to the digital image signal. For example, when the electronic device selects a frequency, the digital signal processor is configured to perform Fourier transform on frequency energy.

The video codec is configured to compress or decompress a digital video. The electronic device may support one or more video codecs. Therefore, the electronic device may play or record videos in a plurality of coding formats, for example, moving picture experts group (MPEG)-1, MPEG-2, MPEG-3, and MPEG-4.

The NPU is a neural-network (NN) computing processor that rapidly processes input information by referring to a structure of a biological neural network, for example, by referring to a transfer mode between human brain neurons, and can further perform self-learning continuously. The NPU can implement applications such as intelligent cognition of the electronic device, for example, image recognition, facial recognition, voice recognition, and text understanding.

The external memory interface 120 may be configured to connect to an external storage card, for example, a micro SD card, to extend a storage capability of the electronic device. The external storage card communicates with the processor 110 through the external memory interface 120, to implement a data storage function. For example, files such as music and a video are stored in the external memory card.

The internal memory 121 may be configured to store computer executable program code. The executable program code includes instructions. The processor 110 runs the instructions stored in the internal memory 121, to implement various functional applications and data processing of the electronic device. For example, in embodiments of this application, when receiving an operation performed by a user to fold the display 194, in response to the operation, the processor 110 may execute a corresponding event by executing the instructions stored in the internal memory 121. For example, the instruction is screen capturing. That is, the processor 110 stores content currently displayed on the display 194 of the electronic device in a form of a screenshot. For another example, the instruction is screen splitting. That is, the processor 110 divides the display 194 of the electronic device into two or more display areas, and displays different interfaces in different display areas. The internal memory 121 may include a program storage area and a data storage area. The program storage area may store an operating system, an application required by at least one function (for example, a sound playing function or an image playing function), and the like. The data storage area may store data (such as audio data and a phone book) created when the electronic device is used, and the like. In addition, the internal memory 121 may include a high-speed random access memory, and may further include a nonvolatile memory, for example, at least one magnetic disk storage device, a flash memory device, or a universal flash storage (UFS).

The electronic device may implement audio functions, for example, music playing and recording, by using the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to code and decode an audio signal. In some embodiments, the audio module 170 may be disposed in the processor 110, or some functional modules of the audio module 170 are disposed in the processor 110.

The speaker 170A, also referred to as a "loudspeaker", is configured to convert an electrical audio signal into a sound signal. The electronic device may be used to listen to music or answer a hands-free call by using the speaker 170A.

The receiver 170B, also referred to as an "earpiece", is configured to convert an audio electrical signal into a sound signal. When a call is answered or voice information is received by using the electronic device, the receiver 170B may be put close to a human ear to receive a voice.

The microphone 170C, also referred to as a "mike" or a "mic", is configured to convert a sound signal into an electrical signal. When making a call, sending voice information, or needing to trigger, by using a voice assistant, the electronic device to perform some functions, the user may make a sound by putting the mouth close to the microphone 170C, and input a sound signal to the microphone 170C. At least one microphone 170C may be disposed in the electronic device. In some other embodiments, two microphones 170C may be disposed in the electronic device, to implement a noise reduction function, in addition to collecting a sound signal. In some other embodiments, three, four, or more microphones 170C may alternatively be disposed in the electronic device, to collect a sound signal and reduce noise. The microphones may further identify a sound source, to implement a directional recording function, and the like.

The headset jack 170D is configured to connect to a wired headset. The headset jack 170D may be the USB interface 130, or may be a 3.5 mm open mobile terminal platform (OMTP) standard interface or a Cellular Telecommunications Industry Association of the USA (CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device determines strength of pressure based on a change of the capacitance. When a touch operation is performed on the display 194, the electronic device detects strength of the touch operation by using the pressure sensor 180A. The electronic device may further calculate a touch position based on a detection signal of the pressure sensor 180A.

The gyroscope sensor 180B may be configured to determine a motion posture of the electronic device. In some embodiments, an angular velocity of the electronic device around three axes (namely, axes x, y, and z) may be determined by using the gyroscope sensor 180B. The gyroscope sensor 180B may be configured to perform image stabilization during photographing. For example, when a shutter is pressed, the gyroscope sensor 180B detects a jitter angle of the electronic device, calculates, based on the angle, a distance for which a lens module needs to compensate, and enables the lens to offset jitter of the electronic device through reverse motion, to implement image stabilization. The gyroscope sensor 180B may be further used in a navigation scenario and a motion-sensing game scenario.

The barometric pressure sensor 180C is configured to measure barometric pressure. In some embodiments, the electronic device calculates an altitude by using the barometric pressure measured by the barometric pressure sensor 180C, to assist in positioning and navigation.

The magnetic sensor 180D includes a Hall effect sensor. The electronic device may detect opening and closing of a flip cover by using the magnetic sensor 180D. In some embodiments, when the electronic device is a clamshell phone, the electronic device may detect opening and closing of the flip cover by using the magnetic sensor 180D. Further, a feature such as automatic unlocking upon opening of the flip cover is set based on a detected opening or closing state of the flip cover or a detected opening or closing state of the flip cover.

The acceleration sensor 180E may detect magnitude of accelerations in various directions (usually on three axes) of the electronic device, and may detect magnitude and a direction of gravity when the electronic device is stationary. The acceleration sensor 180E may be further configured to identify a posture of the electronic device, and is used in applications such as switching between landscape mode and portrait mode or a pedometer.

In embodiments of this application, the display 194 of the electronic device 100 may be folded to form a plurality of screens. Each screen may include a gyroscope sensor 180B and/or an acceleration sensor 180E, configured to measure an elevation angle and/or a flip angle of the corresponding screen. For example, with reference to FIG. 1, the display 194 of the electronic device 100 may be folded to form the screen A 101 and the screen B 102. The screen A 101 and the screen B 102 each include a gyroscope sensor 180B and/or an acceleration sensor 180E, configured to measure elevation angles and/or flip angles of the screen A 101 and the screen B 102. The electronic device may determine a usage status of the foldable screen of the electronic device based on the elevation angle and/or the flip angle obtained through measurement, to determine whether to perform screen locking or switching based on the usage status of the foldable screen of the electronic device, so as to implement intelligent screen locking or automatic screen switching based on different application scenarios. For example, displaying on the screen A 101 and the screen B 102 shown in FIG. 1(c) is controlled.

The distance sensor 180F is configured to measure a distance. The electronic device may measure the distance through infrared or laser. In some embodiments, in a photographing scenario, the electronic device may measure the distance by using the distance sensor 180F, to implement quick focusing.

The optical proximity sensor 180G may include, for example, a light-emitting diode (LED) and an optical detector such as a photodiode. The light-emitting diode may be an infrared light-emitting diode. The electronic device emits infrared light by using the light-emitting diode. The electronic device detects infrared reflected light from a nearby object by using the photodiode. When detecting sufficient reflected light, the electronic device may determine that there is an object near the electronic device. When detecting insufficient reflected light, the electronic device may determine that there is no object near the electronic device. The electronic device may detect, by using the optical proximity sensor 180G, that the user holds the electronic device close to an ear for a call, to automatically turn off a screen for power saving. The optical proximity sensor 180G may also be used in a smart cover mode or a pocket mode to automatically perform screen unlocking or locking.

The ambient light sensor 180L is configured to sense ambient light brightness. The electronic device may adaptively adjust brightness of the display 194 based on the sensed brightness of the ambient light. The ambient light sensor 180L may also be configured to automatically adjust white balance during photographing. The ambient light sensor 180L may further cooperate with the optical proximity sensor 180G to detect whether the electronic device is in a pocket, so as to avoid an unintentional touch.

The fingerprint sensor 180H is configured to collect a fingerprint. The electronic device may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device executes a temperature processing policy by using the temperature detected by the temperature sensor 180J. For example, when the temperature reported by the temperature sensor 180J exceeds a threshold, the electronic device reduces performance of a processor near the temperature sensor 180J, to reduce power consumption and implement heat protection. In some other embodiments, when the temperature is lower than another threshold, the electronic device heats the battery 142, to avoid an abnormal shutdown of the electronic device caused by a low temperature.

The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor 180K. The touch sensor may transfer the detected touch operation to the application processor, to determine a type of a touch event. A visual output related to the touch operation may be provided on the display 194. In some other embodiments, the touch sensor 180K may be alternatively disposed on a surface of the electronic device, and is located at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse to receive a blood pressure beating signal. In some embodiments, the bone conduction sensor 180M may alternatively be disposed in a headset to form a bone conduction headset. The audio module 170 may obtain a voice signal through parsing based on the vibration signal that is of the vibration bone of the vocal-cord part and obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device may receive a button input, and generate a button signal input related to user setting and function control of the electronic device.

The motor 191 may generate a vibration prompt. The motor 191 may be configured to provide an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder, information receiving, an alarm clock, a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or be separated from the electronic device. The electronic device may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195. The plurality of cards may be of a same type or of different types. The SIM card interface 195 may be compatible with different types of SIM cards. The SIM card interface 195 may also be compatible with an external memory card. The electronic device interacts with a network by using the SIM card, to implement functions such as calling and data communication. In some embodiments, the electronic device uses an eSIM, namely, an embedded SIM card. The eSIM card may be embedded into the electronic device, and cannot be separated from the electronic device.

Further, the memory stores a computer program, such as an operating system and an application. The processor 110 is configured to execute the computer program in the memory, to implement a function defined by the computer program. For example, the processor 110 executes the operating system, to implement various functions of the operating system on the electronic device 100. The operating system carried in the electronic device 100 may be iOS®, Android®, Microsoft®, or another operating system. This is not limited in embodiments of this application.

Figure 4:
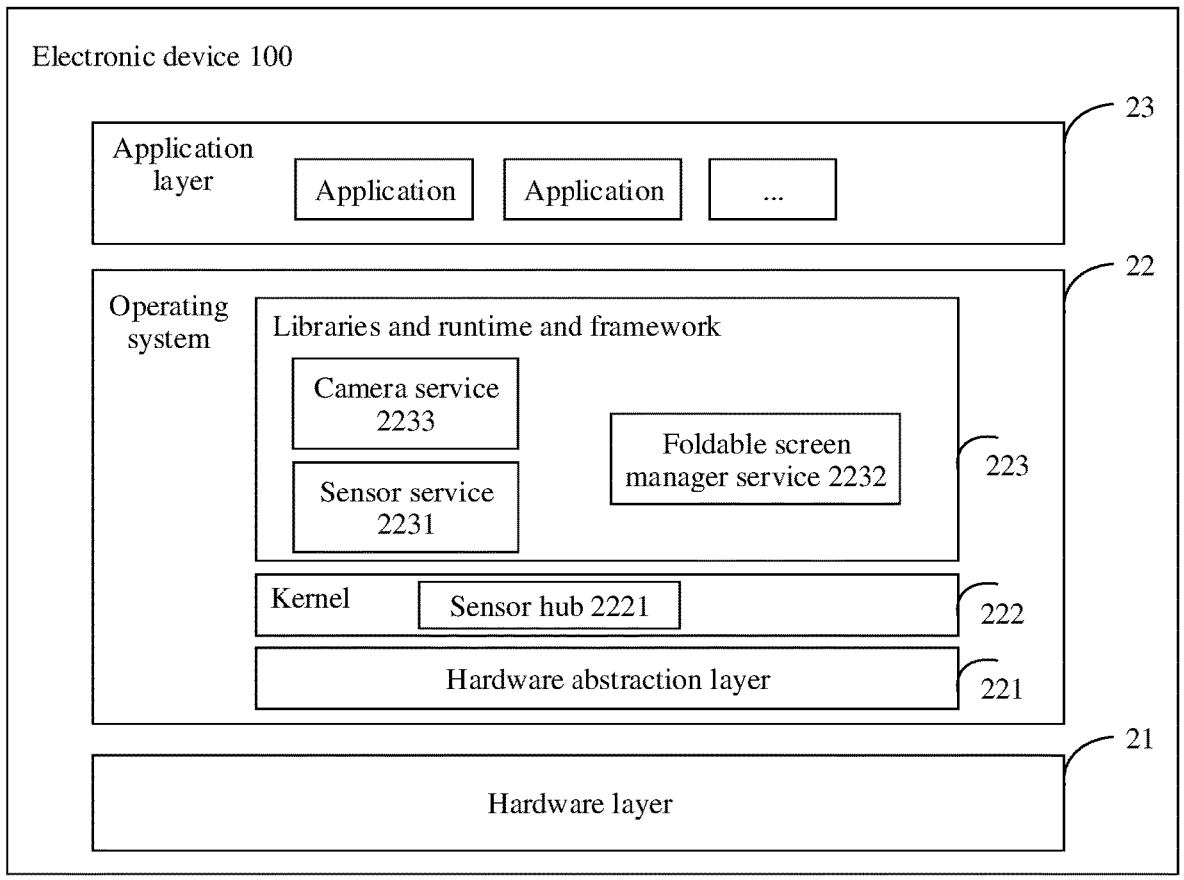
FIG. 4 is a schematic diagram of software division of an electronic device according to an embodiment of this application.

The electronic device 100 carried with the Android® operating system is used as an example. As shown in FIG. 4, the electronic device 100 may be logically divided into a hardware layer 21, an operating system 22, and an application layer 23. The hardware layer 21 includes hardware resources such as the processor 110, the modulator, the demodulator, the sensor, the camera, and the display as described above. The application layer 23 includes one or more applications. For example, the application may be any type of application such as a social application, an e-commerce application, or a browser. The operating system 22 serves as a software middleware between the hardware layer 21 and the application layer 23, and is a computer program that manages and controls hardware and software resources.

In one embodiment, the operating system 22 includes a hardware abstraction layer (HAL) 221, a kernel 222, libraries and runtime and a framework 223. The kernel 222 is used to provide an underlying system component and a service, for example, a sensor hub 2221, power management, memory management, file system management, thread management, and a hardware driver. The hardware driver includes a Wi-Fi driver, a sensor driver, a positioning module driver, and the like. The hardware abstraction layer 221 encapsulates a kernel driver, provides an interface for the framework, and shields implementation details of a lower layer. The hardware abstraction layer 221 runs in user space, and the kernel driver runs in kernel space.

Libraries and runtimes in the framework and the libraries and runtime 223 are also referred to as runtime libraries, and provide library files and execution environments required by executable programs at runtime. The framework is used to provide various basic common components and services for the application in the application layer 23, such as a sensor service 2231, a foldable screen manager service 2232, window management, and location management.

All functions of the components in the operating system described above may be implemented by the processor by executing the program stored in the memory.

The sensor service 2231 and the foldable screen manager service 2232 in the foregoing operating system are explained and described. The processor 110 in embodiments of this application may be configured to execute the computer program in the memory, to implement the display control method for an electronic device with a foldable screen in embodiments of this application. In this way, the foldable screen manager service 2232 obtains sensor data from the sensor service 2231, determines at least one of an elevation angle or a flip angle of the electronic device in a folded state based on the sensor data, and determines a usage status of the foldable screen of the electronic device based on the at least one of the elevation angle or the flip angle, to determine screen locking or switching based on the usage status of the foldable screen of the electronic device, so as to implement intelligent screen locking or automatic screen switching based on different application scenarios. This implements an intelligent terminal device and improves use performance of the terminal device.

In some embodiments, the framework in the framework and the libraries and runtime 223 may further include a camera service 2233, where the camera service 2233 is used to provide a camera service for the application in the application layer 23. When the application needs to invoke the camera, the application may control the camera at the hardware layer by using the camera service 2233.

The "screen locking" in embodiments of this application specifically means locking the first screen or the second screen. For example, locking the first screen may be understood as that the electronic device maintains displaying content on the first screen, and does not switch the content to the second screen.

All the methods in the following embodiments may be implemented in the electronic device having the foregoing hardware structure and software structure.

The display control method for an electronic device with a foldable screen provided in embodiments of this application may be performed by the electronic device shown in any one of FIG. 1(a) to FIG. 1(c) and FIG. 2(a) to FIG. 2(c). With reference to FIG. 1(a) to FIG. 1(c) and FIG. 2(a) to FIG. 2(c), it may be understood that, in embodiments of this application, the electronic device is a foldable-screen electronic device, and includes at least a first screen and a second screen. The first screen and the second screen may be two screens formed by folding a flexible foldable screen along a folding edge, or may be two screens included in a multi-screen foldable screen. In addition, a sensor (for example, a gyroscope sensor and/or an acceleration sensor) is disposed on each screen included in the electronic device, and is configured to measure an elevation angle and/or a flip angle of the screen.

It should be noted that if the electronic device includes only two screens, the first screen and the second screen are the two screens included in the electronic device. For example, with reference to FIG. 1(a) to FIG. 1(c) and FIG. 2(a) to FIG. 2(c), the first screen and the second screen are respectively the screen A and the screen B.

The following describes in detail, with reference to a specific scenario, the control method for an electronic device with a foldable screen provided in embodiments of this application. For ease of description, the following embodiment is described by using an example in which each screen of the electronic device measures the elevation angle and/or the flip angle of the screen by disposing the gyroscope sensor and the acceleration sensor.

Figure 5:
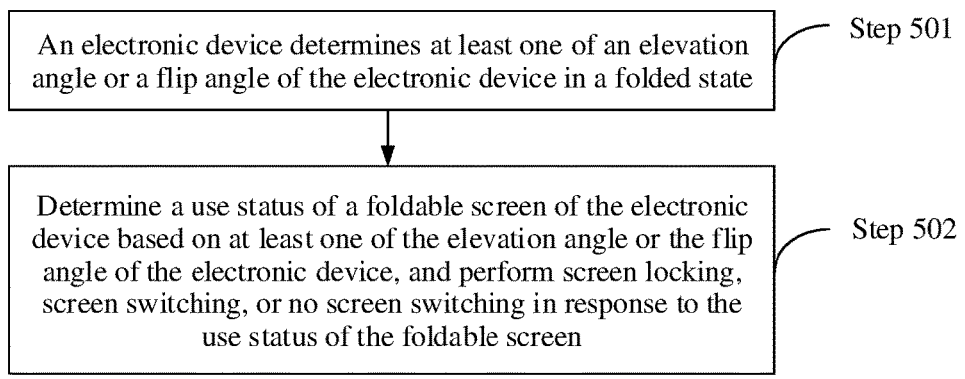
FIG. 5 is a schematic flowchart of a display control method for an electronic device with a foldable screen according to an embodiment of this application.

FIG. 5 is a schematic flowchart of a display control method for an electronic device with a foldable screen according to an embodiment of this application. As shown in FIG. 5, the method may include the following steps.

Step 501: The electronic device determines at least one of an elevation angle or a flip angle of the electronic device in a folded state.

For example, the electronic device may determine whether the electronic device is in the folded state by determining whether an included angle α between a first screen and a second screen meets a preset condition. If it is determined that the included angle α between the first screen and the second screen meets the preset condition, the electronic device may determine that the electronic device is in the folded state. If the included angle α between the first screen and the second screen does not meet the preset condition, the electronic device may determine that the electronic device is in an unfolded state, where the unfolded state may be an expanded state, a support state, or the like. For example, the preset condition may be α∈[0, 20].

In some embodiments, the electronic device may determine the included angle α between the first screen and the second screen by using gyroscope sensors and acceleration sensors that are disposed on the first screen and the second screen. For example, the electronic device may determine the included angle α between the first screen and the second screen based on triaxial component data (Gxm, Gym, Gzm) of the gyroscope sensor and the acceleration sensor of the first screen and triaxial component data (Gxs, Gys, Gzs) of the gyroscope sensor and the acceleration sensor of the second screen. Gxm represents a component of the gyroscope sensor and the acceleration sensor of the first screen in an X-axis direction, Gym represents the component data of the gyroscope sensor and the acceleration sensor of the first screen in a Y-axis direction, and Gzm represents the component data of the gyroscope sensor and the acceleration sensor of the first screen in a Z-axis direction. Gxs represents a component data of the gyroscope sensor and the acceleration sensor of the second screen in an X-axis direction, Gys represents the component data of the gyroscope sensor and the acceleration sensor of second first screen in a Y-axis direction, and Gzs represents the component data of the gyroscope sensor and the acceleration sensor of the second screen in a Z-axis direction. The component in the X-axis direction is parallel to a short side of the first screen or the second screen of the electronic device, a component in the Y-axis direction is parallel to a long side of the first screen or the second screen of the electronic device, and a component in the Z-axis is perpendicular to a plane of the first screen or the second screen.

It should be noted that a periodicity for determining the included angle α between the first screen and the second screen may be predefined, or may be preconfigured (for example, configured in the electronic device when the electronic device is delivered from a factory), or may be set by a user. This is not specifically limited in embodiments of this application.

For example, the electronic device may further determine at least one of the elevation angle or the flip angle of the electronic device by using the gyroscope sensor(s) and the acceleration sensor(s) that are disposed on the first screen or the second screen. For example, the electronic device may further calculate at least one of the elevation angle or the flip angle of the electronic device based on the triaxial component data of the gyroscope sensor(s) and the acceleration sensor(s) of a user-facing screen of the electronic device. The user-facing screen may be the first screen or the second screen.

The elevation angle may be an included angle between a user-facing screen of the electronic device and a vertical direction, and the vertical direction may be a direction opposite to a gravity direction, that is, an upward direction.

For example, the elevation angle of the user-facing screen of the electronic device may be calculated in the following manner, and an example in which the user-facing screen of the electronic device is the first screen is used for description.

$$\theta = \arccos(|Gzm|/|Gzmax|) \quad (1)$$

θ represents the elevation angle, Gzmax represents a maximum vector of a Z-axis of the gyroscope sensor and the acceleration sensor of the user-facing screen of the electronic device, and the maximum vector of the Z-axis may be a vector in the vertical direction.

For example, the flip angle of the user-facing screen of the electronic device may be calculated in the following manner, and an example in which the user-facing screen of the electronic device is the first screen is used for description.

$$\sigma = \arccos(|Gxm|/|Gxmax|) \quad (2)$$

a represents the flip angle, Gxmax represents a maximum vector of an X-axis of the gyroscope sensor and the acceleration sensor of the user-facing screen of the electronic device, and the maximum vector of the X-axis may be a vector in a horizontal direction.

For example, the sensor hub 2221 shown in FIG. 4 may transfer the triaxial component data of the gyroscope sensors and the acceleration sensors of the first screen and the second screen to the sensor service 2231. The sensor service 2231 transfers the triaxial component data of the gyroscope sensors and the acceleration sensors of the first screen and the second screen to the foldable screen manager service 2232. The foldable screen manager service 2232 determines at least one of the elevation angle or the flip angle of the electronic device in the folded state based on the triaxial component data of the gyroscope sensors and the acceleration sensors of the first screen and the second screen.

In some embodiments, when the triaxial component data measured by the gyroscope sensors and the acceleration sensors of the first screen and the second screen changes, the sensor service 2231 transfers the triaxial component data of the gyroscope sensors and the acceleration sensors of the first screen and the second screen to the foldable screen manager service 2232. The foldable screen manager service 2232 determines the elevation angle and the flip angle of the electronic device in the folded state based on the triaxial component data of the gyroscope sensors and the acceleration sensors of the first screen and the second screen.

Step 502: Determine a usage status of a foldable screen of the electronic device based on at least one of the elevation angle or the flip angle of the electronic device, and perform screen locking, or screen switching, or not to perform screen switching, in response to the usage status of the foldable screen.

Before step 502 is performed, a display status of the electronic device in the folded state is: One of the first screen and the second screen is on, and the other is off. The screen locking, or the screen switching is performed, or no screen switching is performed at step 502. The screen switching in embodiments of this application specifically refers to switching between the first screen and the second screen. For example, if the electronic device performs displaying on the first screen, and the second screen is off, after the screen switching is performed, the electronic device performs displaying on the second screen, and the first screen is off. The screen A and the screen B shown in FIG. 1(c) are used as examples. It is assumed that before step 501 in this embodiment is performed, the screen A is on, and the screen B is off. That is, the electronic device displays a content interface on the screen A. When determining to perform the screen switching by performing step 501 and step 502 in this embodiment, the electronic device switches the content interface from the screen A to the screen B. That is, the screen A is off, and the screen B is on.

A difference between the screen locking and the no screen switching is described as follows: The screen locking is that the first screen or the second screen is locked as described above. During the locking of the first screen or the second screen, the electronic device does not change a display status of the first screen or the second screen in another manner (for example, based upon detection of a user's holding position). After unlocking, the display status of the first screen or the second screen may be changed in another manner (for example, based upon detection of a user's holding position). The no screen switching means that only an operation performed by the electronic device this time is not performing screen switching, and then the electronic device may change the display status of the first screen or the second screen in another manner (for example, based upon the detection of a user's holding position).

For example, the usage status may include any one of a first usage status, a second usage status, a third usage status, or a fourth usage status. The first usage status may be that the electronic device is in the folded state, and the elevation angle of the electronic device falls within a first preset range. The first preset range may be (A, B), where A is any value between 15 and 25, and B is any value between 65 and 75. For example, the first preset range may be (20, 70). The second usage status may be that the electronic device is in the folded state, and the elevation angle of the electronic device does not fall within the first preset range. The third usage status may be that the electronic device is in the folded state, the foldable screen of the electronic device is flipped, and the electronic device is in a selfie state. The selfie state may also be understood as that a camera of the electronic device faces the user. The fourth usage status may be that the electronic device is in the folded state, the foldable screen of the electronic device is flipped, and the electronic device is in a code scanning state. The code scanning state may also be understood as that the camera of the electronic device is on the other side of the user-facing screen, and the camera of the electronic device approaches a target object, for example, a two-dimensional code.

In some embodiments, the foldable screen manager service 2232 determines the first usage status of the foldable screen of the electronic device based on the elevation angle of the electronic device, and performs the screen locking in response to the first usage status of the foldable screen. In an implementation, the foldable screen manager service 2232 determines, based on the elevation angle of the electronic device, a first use posture of using the electronic device by the user, and locks the first screen in response to the first use posture. The first screen is a screen that is turned on by the electronic device before the method in embodiments of this application is performed.

In some embodiments, the foldable screen manager service 2232 determines the second usage status of the foldable screen of the electronic device based on the elevation angle of the electronic device, and performs the screen switching in response to the second usage status of the foldable screen. In an implementation, the foldable screen manager service 2232 determines, based on the elevation angle of the electronic device, a second use posture of using the electronic device by the user, and in response to the second use posture, switches from performing displaying on the first screen to performing displaying on the second screen. The first screen is a screen that is turned on by the electronic device before the method in embodiments of this application is performed, and the second screen is a screen that is turned off by the electronic device before the method in embodiments of this application is performed.

In some embodiments, the foldable screen manager service 2232 determines the third usage status of the foldable screen of the electronic device based on the flip angle of the electronic device, a usage scenario of the camera, and whether an object approaches the electronic device, and performs the screen switching in response to the third usage status of the foldable screen. In an implementation, when the electronic device detects a photographing scenario of the camera and a flip operation performed by the user on the electronic device, the electronic device detects whether an object approaches the electronic device. When detecting that no object approaches the electronic device, the electronic device switches from performing displaying on the first screen to performing displaying on the second screen. The first screen is the screen that is turned on by the electronic device before the method in embodiments of this application is performed, and the second screen is the screen that is turned off by the electronic device before the method in embodiments of this application is performed.

In some embodiments, the foldable screen manager service 2232 determines the fourth usage status of the foldable screen of the electronic device based on the flip angle of the electronic device, a usage scenario of the camera, and whether an object approaches the electronic device, and does not perform screen switching in the fourth usage status. In an implementation, when the electronic device detects a photographing scenario of the camera and a flip operation performed by the user on the electronic device, the electronic device detects whether an object approaches the electronic device. When detecting that an object approaches the electronic device, the electronic device maintains the first screen on and the second screen off. The first screen is the screen that is turned on by the electronic device before the method in embodiments of this application is performed, and the second screen is the screen that is turned off by the electronic device before the method in embodiments of this application is performed.

In this embodiment, the electronic device determines at least one of the elevation angle or the flip angle of the electronic device in the folded state, determines the usage status of the foldable screen of the electronic device based on the at least one of the elevation angle or the flip angle of the electronic device, performs the screen locking or the screen switching, or does not perform screen switching in response to the usage status of the foldable screen, to determine to perform the screen locking or the screen switching, or not to perform screen switching, based on the usage status of the foldable screen of the electronic device, so as to implement intelligent screen locking or automatic screen switching based on different application scenarios.

This implements an intelligent terminal device, and improves use performance of the terminal device.

Figure 6A:
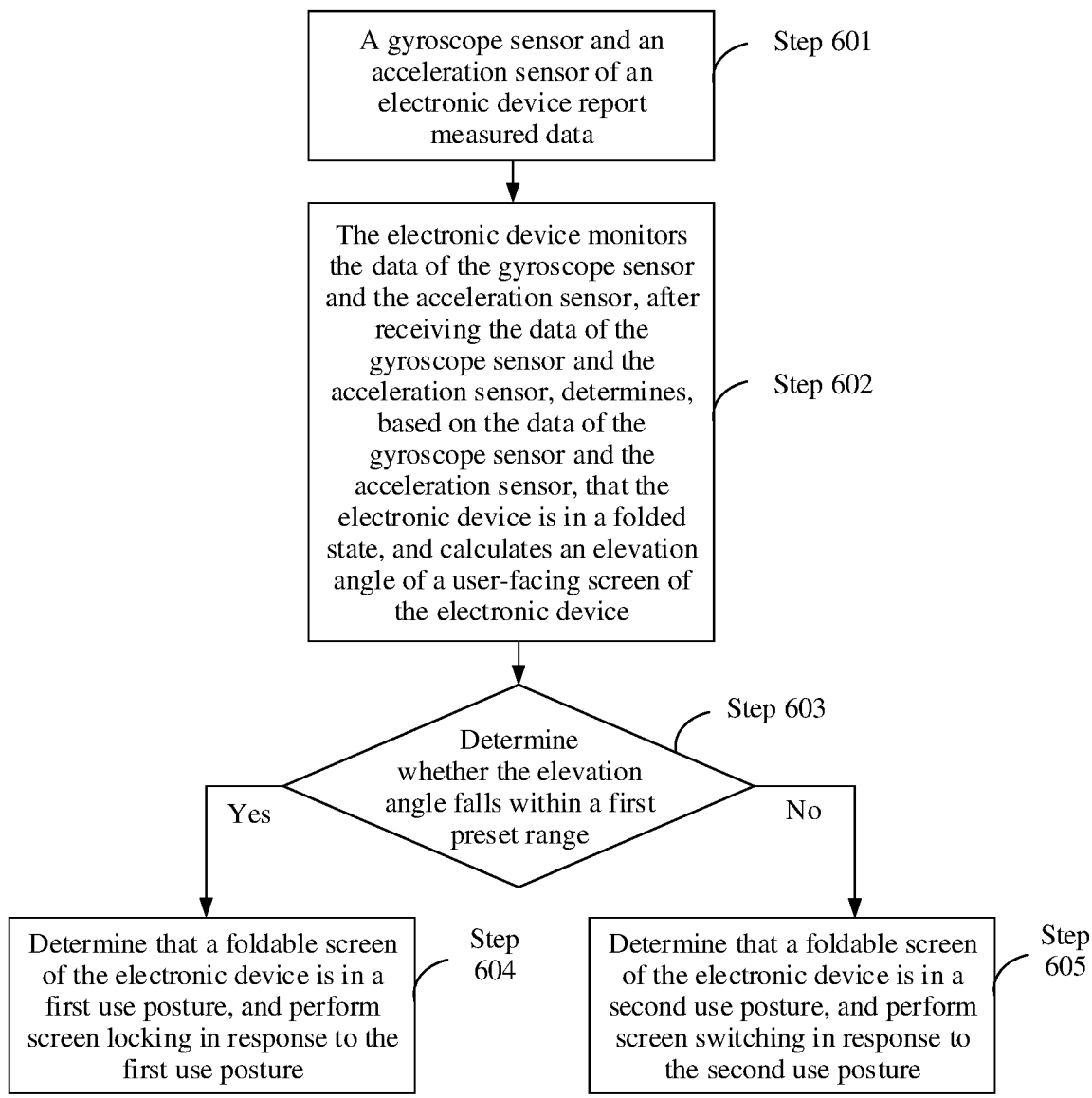
FIG. 6A is a schematic flowchart of another display control method for an electronic device with a foldable screen according to an embodiment of this application.

In some embodiments, when the camera of the electronic device is disabled, the electronic device may determine, based on the elevation angle in the embodiment shown in FIG. 6A, a use posture of using the electronic device by the user, and perform the screen locking or the screen switching based on the use posture of using the electronic device by the user. When the camera of the electronic device is enabled, the electronic device may detect the flip angle and whether an object approaches the electronic device by using the embodiment shown in FIG. 7A, and perform the screen switching or not based on the flip angle and whether an object approaches the electronic device. For a specific implementation, refer to the disclosure of the following embodiments.

FIG. 6A is a schematic flowchart of a display control method for an electronic device with a foldable screen according to an embodiment of this application. As shown in FIG. 6A, the method may include the following steps.

Step 601: The gyroscope sensor and the acceleration sensor of the electronic device report measured data.

For example, when data changes, the gyroscope sensor and the acceleration sensor may report the measured data to the sensor hub 2221 in the kernel 222 shown in FIG. 4.

Step 602: The electronic device monitors the data of the gyroscope sensor and the acceleration sensor, after receiving the data of the gyroscope sensor and the acceleration sensor, determines, based on the data of the gyroscope sensor and the acceleration sensor, that the electronic device is in a folded state, and calculates an elevation angle of a user-facing screen of the electronic device.

For example, the sensor service 2231 in the framework may monitor the data of the gyroscope sensor and the acceleration sensor. The sensor hub 2221 may transfer triaxial component data of the gyroscope sensor and the acceleration sensor to the sensor service 2231 in the framework. When receiving the triaxial component data of the gyroscope sensor and the acceleration sensor, the sensor service 2231 transfers the triaxial component data of the gyroscope sensor and the acceleration sensor to the foldable screen manager service 2232.

The foldable screen manager service 2232 determines, based on the data of the gyroscope sensor and the acceleration sensor, that the electronic device is in the folded state. That is, the included angle between the two screens as described above falls within a value range [0°, 20°].

When the camera of the electronic device is disabled, the foldable screen manager service 2232 may determine the elevation angle of the user-facing screen of the electronic device based on the data of the gyroscope sensor and the acceleration sensor.

Figure 6B:
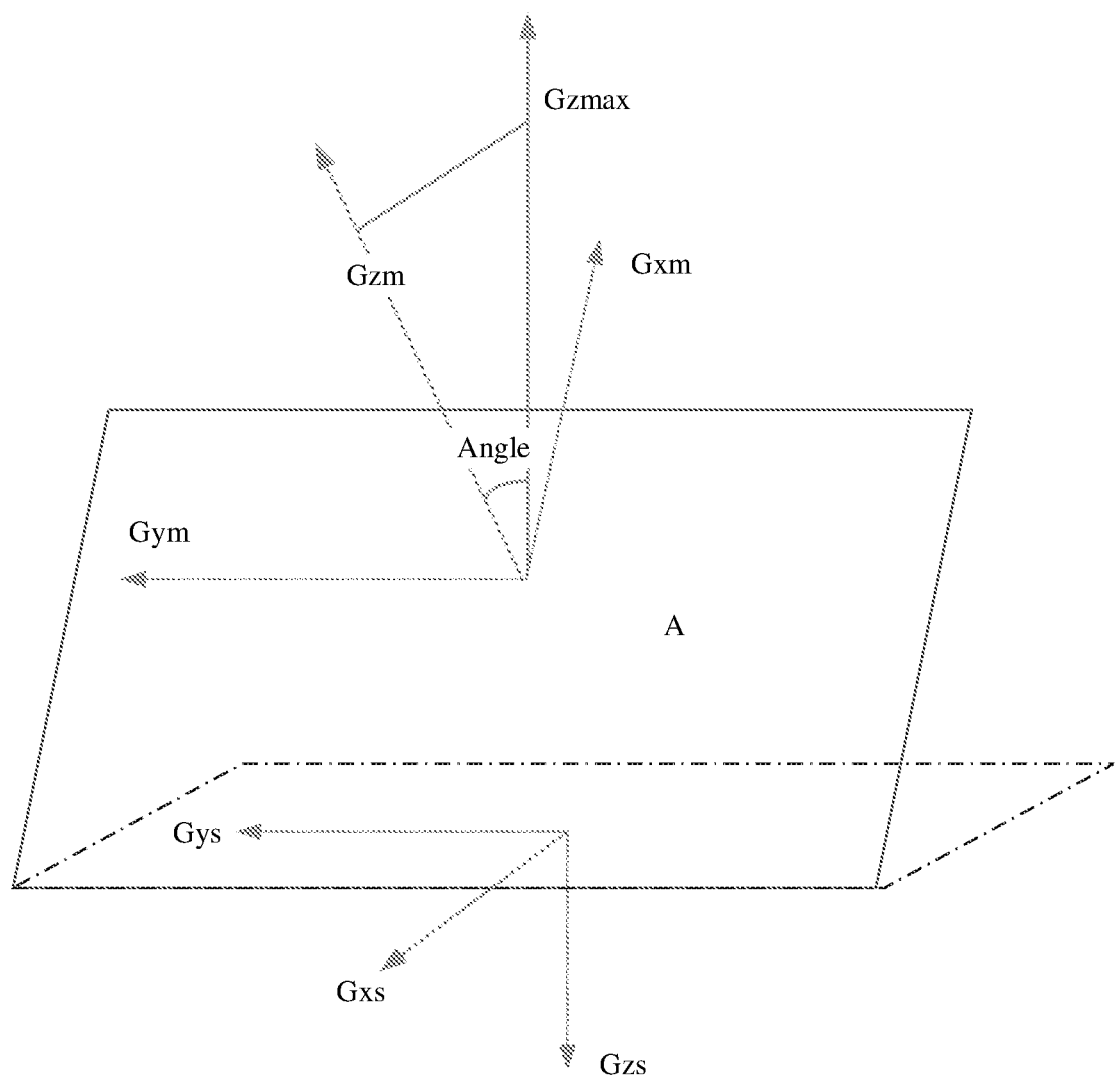
FIG. 6B is a schematic diagram of an elevation angle of an electronic device according to an embodiment of this application.

The electronic device shown in FIG. 6B is used as an example for description. A screen A of the electronic device faces the user, and an elevation angle of the screen A can be determined. Triaxial component data of the screen A and a screen B, and Gzmax of the screen A may be shown in FIG. 6B. The elevation angle of the screen A can be determined according to a formula (1).

Step 603: Determine whether the elevation angle falls within a first preset range, if the elevation angle falls within the first preset range, perform step 604, and if the elevation angle does not fall within the first preset range, perform step 605.

For example, the foldable screen manager service 2232 may determine whether the elevation angle falls within the first preset range. Because the screen A is the user-facing screen, it may be determined whether the elevation angle of the screen A falls within a value range (20, 70), to determine a first use posture or a second use posture of using the electronic device by the user.

In some embodiments, an elevation angle of the screen B may alternatively be determined, and a use posture of using the electronic device by the user is determined based on the elevation angle of the screen B, where the screen B is a screen of the two screens that is farther away from the user. For example, it is determined whether the elevation angle of the screen B falls within a second preset range, where the second preset range may be (110, 160). If the elevation angle of the screen B falls within the second preset range, the first use posture of using the electronic device by the user is determined. If the elevation angle of the screen B does not fall within the second preset range, the second use posture of using the electronic device by the user is determined.

Step 604: Determine the first use posture of using the electronic device by the user, and perform screen locking in response to the first use posture.

For example, in response to the first use gesture, the electronic device may maintain the screen A on and the screen B off, that is, lock the screen A, and do not switch to the screen B.

In some embodiments, when determining that the elevation angle falls within the first preset range, the foldable screen manager service 2232 may further monitor whether the elevation angle of the user-facing screen of the electronic device falls within the first preset range in a first preset time period. If the elevation angle of the user-facing screen of the electronic device falls within the first preset range in the first preset time period, the first use posture of using the electronic device by the user may be determined.

The electronic device may identify, by performing step 601 to step 604, the first use posture of using the electronic device by the user, where the first use posture may be that the user uses the electronic device in the folded state in a lying posture. That is, the electronic device may intelligently identify an application scenario in which the user uses the electronic device, and perform screen locking based on a use requirement of the application scenario, to avoid false triggering of screen switching of the electronic device and impact on use experience of the user.

Step 605: Determine the second use posture of using the electronic device by the user, and perform screen switching in response to the second use posture.

For example, in response to the second use gesture, the electronic device may turn off the screen A and turn on the screen B, to implement the screen switching. The screen A and the screen B shown in FIG. 1(c) are used as examples. It is assumed that before the steps in this embodiment are performed, the screen A is on, and the screen B is off. That is, the electronic device displays a content interface on the screen A. When determining to perform the screen switching by performing step 605 in this embodiment, the electronic device switches the content interface from the screen A to the screen B. That is, the screen A is off, and the screen B is on.

A usage scenario is used as an example for description. When the user uses the electronic device in the lying posture, the electronic device is locked to display content on the screen A by performing step 604. When the user changes from the lying posture to another posture, for example, the user uses the electronic device in a standing posture, the electronic device may switch from displaying the content on the screen A to displaying the content on the screen B in the determined second use posture by performing step 605.

In embodiments of this application, the electronic device detects the elevation angle of the electronic device in the folded state, determines, based on the elevation angle of the electronic device, a use posture of using the electronic device by the user, and performs the screen locking or screen switching in response to the use posture of the folded screen, to determine the screen locking or screen switching based on the use posture of using the electronic device by the user, so as to implement intelligent screen locking or automatic screen switching based on different application scenarios. This implements an intelligent terminal device, and improves use performance of the terminal device. For example, the user uses the electronic device in embodiments of this application in the lying posture. The electronic device in embodiments of this application performs the display control method in embodiments of this application to avoid incorrect switching of the two screens, or implement the automatic screen switching when the user changes from the lying posture to the standing posture.

Figure 7A:
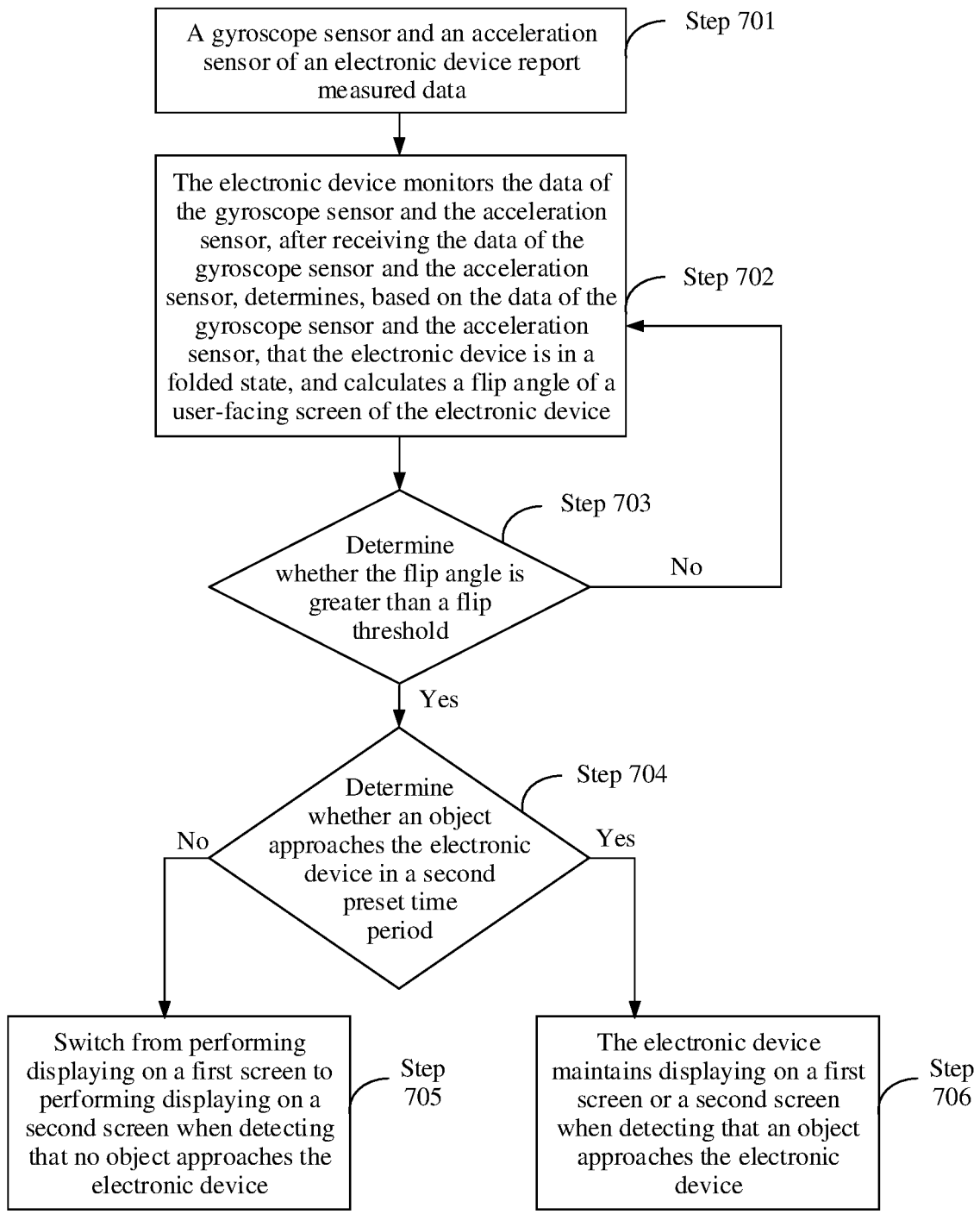
FIG. 7A is a schematic flowchart of another display control method for an electronic device with a foldable screen according to an embodiment of this application.

FIG. 7A is a schematic flowchart of a display control method for an electronic device with a foldable screen according to an embodiment of this application. As shown in FIG. 7A, the method may include the following steps.

Step 701: The gyroscope sensor and the acceleration sensor of the electronic device report measured data.

For explanation and description of step 701, refer to step 601 in the embodiment shown in FIG. 6A.

Step 702: The electronic device monitors the data of the gyroscope sensor and the acceleration sensor, after receiving the data of the gyroscope sensor and the acceleration sensor, determines, based on the data of the gyroscope sensor and the acceleration sensor, that the electronic device is in a folded state, and calculates a flip angle of a user-facing screen of the electronic device.

For example, the foldable screen manager service 2232 may identify a usage scenario (for example, photo shooting or photographing) of the camera by using the camera service 2233. That is, the camera of the electronic device is enabled. When the camera of the electronic device is enabled, the foldable screen manager service 2232 may determine the flip angle of the user-facing screen of the electronic device based on the data of the gyroscope sensor and the acceleration sensor.

Figure 7B:
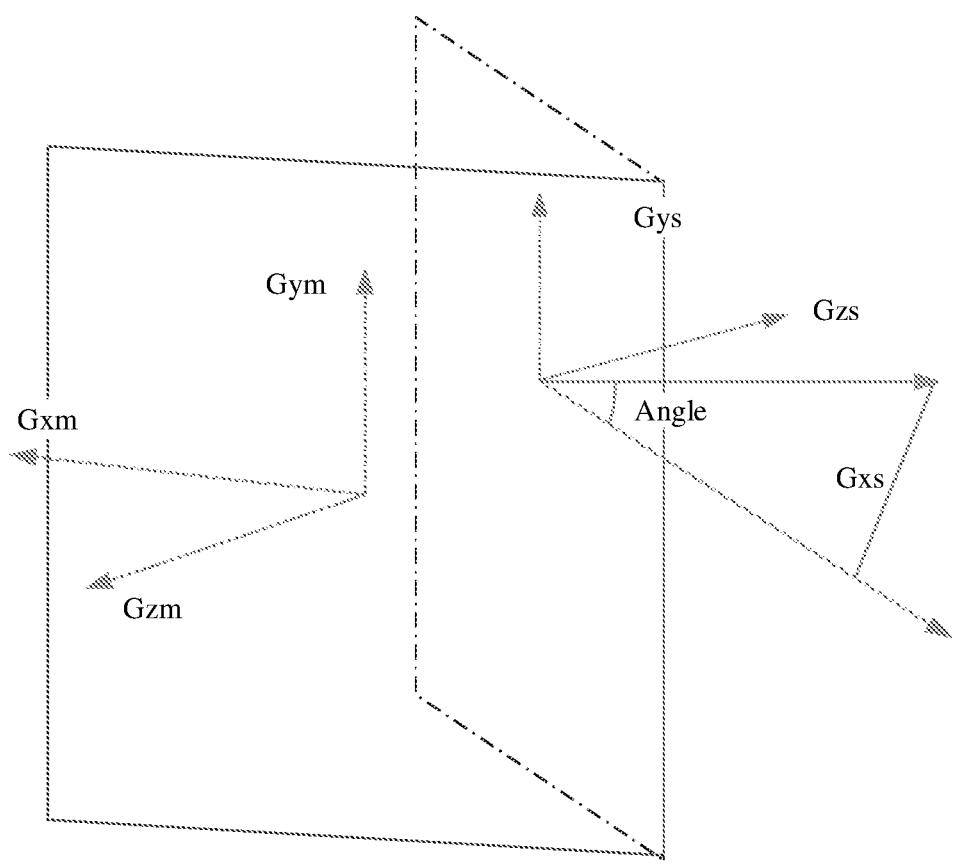
FIG. 7B is a schematic diagram of a flip angle of an electronic device according to an embodiment of this application.

The electronic device shown in FIG. 7B is used as an example for description. A screen A of the electronic device faces the user, and a flip angle of the screen A can be determined. Triaxial component data of the screen A and a screen B, and Gxmax of the screen A may be shown in FIG. 7B. The flip angle of the screen A can be determined according to a formula (2).

For example, the screen A in this embodiment may be the screen with a larger size in FIG. 1(*c*).

Step 703: Determine whether the flip angle is greater than a flip threshold; if the flip angle is greater than the flip threshold, perform step 704; and if the flip angle is not greater than the flip threshold, perform step 702.

For example, the foldable screen manager service 2232 may determine whether the flip angle is greater than the flip threshold. When the flip angle is greater than the flip threshold, the electronic device is flipped. In this embodiment, an application scenario of the electronic device may be intelligently identified by using the following step 704, to perform automatic screen switching or not to perform screen switching based on different application scenarios. For example, a selfie scenario or a code scanning scenario may be intelligently identified by using the following step 704.

Step 704: Determine whether an object approaches the electronic device in a second preset time period; if no object approaches the electronic device in the second preset time period, perform step 705; and if an object approaches the electronic device in the second preset time period, perform step 706.

For example, the foldable screen manager service 2232 may determine, by using the sensor service 2231, whether an optical proximity event occurs in the second preset time period, to determine whether an object approaches the electronic device. The optical proximity event may come from the optical proximity sensor.

Step 705: When it is detected that no object approaches the electronic device, switch from performing displaying on a first screen to performing displaying on a second screen.

For example, before the steps in this embodiment are performed, the screen A is on and the screen B is off. The electronic device controls the screen A to be turned off and the screen B to be turned on by performing step 705, to implement screen switching. That is, content displayed on the screen A is switched to the screen B for display.

When determining that the flip angle is greater than the flip threshold, and no object approaches the electronic device in the second preset time period, the foldable screen manager service 2232 may determine that the application scenario of the electronic device is a selfie scenario. Therefore, the foldable screen manager service may perform the automatic screen switching based on a use requirement of the selfie scenario.

Step 706: When detecting that an object approaches the electronic device, the electronic device maintains displaying on the first screen or the second screen.

For example, before the steps in this embodiment are performed, the screen A is on and the screen B is off. The electronic device may maintain the screen A on and the screen B off by performing step 706.

When determining that the flip angle is greater than the flip threshold, and an object approaches the electronic device in the second preset time period, the foldable screen manager service 2232 may determine that the application scenario of the electronic device is a code scanning scenario. Therefore, the foldable screen manager service may maintain the display status of the two screens based on a use requirement of the code scanning scenario.

In this embodiment, when detecting a photographing scenario of the camera and a flip operation performed by a user on the electronic device, the electronic device detects whether an object approaches the electronic device, and performs screen switching or maintains the current displaying based on a detection result, so that the electronic device intelligently identifies the application scenario of the electronic device, and performs automatic screen switching or does not perform screen switching based on the use requirement of the application scenario. This implements an intelligent terminal device and improves use performance of the terminal device.

Figure 8:
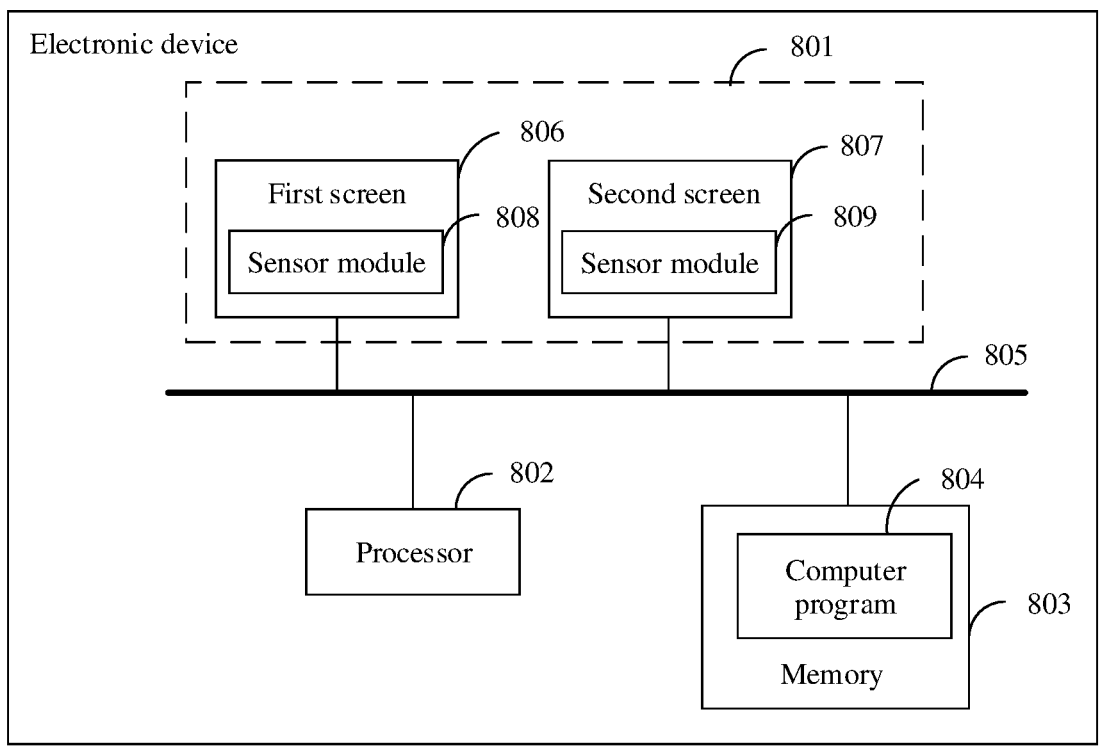
FIG. 8 is a schematic diagram of a structure of an electronic device according to an embodiment of this application.

Some other embodiments of this application further provide an electronic device, configured to perform the methods in the foregoing method embodiments. As shown in FIG. 8, the electronic device may include: a foldable screen 801, where the foldable screen 801 is a display, and includes or may be folded to form at least a first screen 806 and a second screen 807, a sensor module 808 may be disposed on the first screen 806, and is configured to measure at least one of an elevation angle or a flip angle of the first screen 806, and a sensor module 809 may be disposed on the second screen 807, and is configured to measure at least one of an elevation angle or a flip angle of the second screen 807; one or more processors 802; and a memory 803, where the foregoing components may be connected through one or more communication buses 805. The memory 803 stores one or more computer programs 804, and the one or more processors 802 are configured to execute the one or more computer programs 804. The one or more computer programs 804 include instructions, and the instructions may be used to perform the steps performed by the electronic device in the foregoing method embodiments.

For example, the one or more processors 802 are configured to run the one or more computer programs 804, so as to implement the following actions: determining a first use posture of using the electronic device by a user, and locking the first screen in response to the first use posture; or when detecting a photographing scenario of a camera and a flip operation performed by the user on the electronic device, detecting whether an object approaches the electronic device, and in response to a detection result, switching from performing displaying on the first screen to performing displaying on the second screen, or maintaining the first screen on and the second screen off.

In some embodiments, the determining a first use posture of using the electronic device by the user may include: detecting an elevation angle of the electronic device in a folded state, where the elevation angle is an included angle between the first screen and a vertical direction; and determining, based on the elevation angle, the first use posture of using the electronic device by the user.

In some other embodiments, the determining, based on the elevation angle, the first use posture of using the electronic device by the user includes: determining, when detecting that the elevation angle falls within a first preset range, the first use posture of using the electronic device by the user, where the first preset range includes 20° to 70°, and the elevation angle is an included angle between a direction perpendicular to the first screen and the vertical direction.

In some other embodiments, the determining, when detecting that the elevation angle falls within a first preset range, the first use posture of using the electronic device by the user includes: when detecting that the elevation angle falls within the first preset range in a first preset time period, determining the first usage status of using the electronic device by the user.

In some other embodiments, the following actions are further implemented: determining a second use posture of using the electronic device by the user, and in response to the second use posture, switching from performing displaying on the first screen to performing displaying on the second screen.

In some other embodiments, the detecting whether an object approaches the electronic device, and in response to a detection result, switching from performing displaying on the first screen to performing displaying on the second screen, or maintaining the first screen on and the second screen off includes: when detecting that an object approaches the electronic device, maintaining the first screen on and the second screen off; and when detecting that no object approaches the electronic device, switching from performing displaying on the first screen to performing displaying on the second screen.

In some other embodiments, the following actions are further implemented: detecting a flip angle of the electronic device, and when the flip angle is greater than a flip threshold, detecting whether an object approaches the electronic device.

In some other embodiments, the detecting whether an object approaches the electronic device includes: detecting, in a second preset time period, whether an object approaches the electronic device.

Certainly, the electronic device shown in FIG. 8 may further include other components such as an audio module and a SIM card interface. This is not limited in embodiments of this application. When the electronic device includes the other components, the electronic device may be specifically the electronic device shown in FIG. 3.

The sensor module may be a gyroscope sensor or an acceleration sensor. Alternatively, a gyroscope sensor and an acceleration sensor may be disposed on the first screen 806 to measure at least one of the elevation angle or the flip angle of the first screen 806, and a gyroscope sensor and an acceleration sensor may be disposed on the second screen 807 to measure at least one of the elevation angle or the flip angle of the second screen 807.

Some other embodiments of this application further provide a computer storage medium. The computer storage medium may include computer instructions. When the computer instructions are run on an electronic device, the electronic device is enabled to perform the steps performed by the electronic device in the foregoing method embodiments.

Some other embodiments of this application further provide a computer program product. When the computer program product runs on a computer, the computer is enabled to perform the steps performed by the electronic device in the foregoing method embodiments.

Some other embodiments of this application further provide an apparatus. The apparatus has a function of implementing behaviors of the electronic device in the foregoing method embodiments. The function may be implemented by hardware, or may be implemented by hardware executing corresponding software. The hardware or software includes one or more modules corresponding to the function, for example, a determining unit or module, a storage unit or module, a division unit or module, and a display unit or module.

The foregoing descriptions about implementations allow a person skilled in the art to clearly understand that, for the purpose of convenient and brief description, division of the foregoing functional modules is used as an example for illustration. In actual application, the foregoing functions can be allocated to different functional modules for implementation based on a requirement. That is, an inner structure of an apparatus is divided into different functional modules to implement all or some of the functions described above.

In several embodiments provided in this application, it should be understood that the disclosed apparatus and method may be implemented in other manners. For example, the described apparatus embodiment is merely an example. For example, division into units is merely logical function division and may be other division in an actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separate, and components displayed as units may be one or more physical units, in other words, may be located in one place, or may be distributed on a plurality of different places. Some or all of the units may be selected based on an actual requirement to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of embodiments of this application essentially, or the part contributing to the current technology, or all or some of the technical solutions may be implemented in the form of a software product. The software product is stored in a storage medium and includes several instructions for instructing a device (which may be a single-chip microcomputer, a chip or the like) or a processor to perform all or some of the steps of the methods described in embodiments of this application. The storage medium includes: any medium that can store program code, such as a USB flash drive, a removable hard disk, a read-only memory (ROM), a random access memory (RAM), a magnetic disk, or an optical disc.

The foregoing descriptions are merely non-limiting examples of implementations of embodiments of this application, and are not intended to limit the protection scope, which is intended to cover any variation or replacement readily determined by a person skilled in the art. Therefore, the claims shall define the protection scope.

What is claimed is:

1. A display control method performed by an electronic device with a foldable screen, wherein the electronic device is in a folded state, a first screen of the electronic device is on, a second screen of the electronic device is off, and the method comprises:
    determining whether a first use posture of using the electronic device is performed by a user, and locking the first screen in response to the determination of the first use posture being performed; and
    upon detecting a photographing scenario of a camera of the electronic device and a flip operation performed by the user of the electronic device, detecting whether an object approaches the electronic device, and in response to a result of detecting whether an object approaches the electronic device, switching from performing displaying merely on the first screen to performing displaying merely on the second screen, or maintaining the first screen on and the second screen off,
    wherein in response to a result of detecting whether an object approaches the electronic device, switching from performing displaying merely on the first screen to performing displaying merely on the second screen, or maintaining the first screen on and the second screen off upon detecting that an object approaches the electronic device, maintaining the first screen comprises:
    upon detecting that an object approaches the electronic device, maintaining the first screen on and the second screen off, and
    upon detecting that no object approaches the electronic device and when the first screen is not locked, switching from performing displaying merely on the first screen to performing displaying merely on the second screen.

2. The method according to claim 1, wherein the determining whether a first use posture of using the electronic device is performed by a user comprises:
    detecting an elevation angle of the electronic device in the folded state, wherein the elevation angle is an included angle between the first screen and a vertical direction; and
    determining, based on the elevation angle, whether the first use posture of using the electronic device is performed by the user.

3. The method according to claim 2, wherein the determining, based on the elevation angle, the first use posture of using the electronic device by the user comprises:
    upon detecting that the elevation angle falls within a first preset range, determining that the first use posture of using the electronic device is performed by the user, wherein the first preset range comprises 20° to 70°, and the elevation angle is an included angle between a direction perpendicular to the first screen and the vertical direction.

4. The method according to claim 3, wherein the detecting that the elevation angle falls within a first preset range comprises detecting that the elevation angle falls within the first preset range in a first preset time period.

5. The method according to claim 1, further comprising:
    determining whether a second use posture of using the electronic device is performed by the user, and in response to the determination of the second use posture being performed, switching from performing displaying merely on the first screen to performing displaying merely on the second screen.

6. The method according to claim 1, further comprising:
    detecting a flip angle of the electronic device, and when the flip angle is greater than a flip threshold, detecting whether an object approaches the electronic device.

7. The method according to claim 1, wherein the detecting whether an object approaches the electronic device comprises:
    detecting, in a second preset time period, whether the object approaches the electronic device.

8. The method according to claim 1, wherein detecting whether an object approaches the electronic device comprises determining whether an optical proximity event is received from an optical proximity sensor in the electronic device during a preset time period.

9. An electronic device, comprising one or more processors, a memory, and a foldable screen, wherein the foldable screen comprises at least a first screen and a second screen, configured to display content according to instructions of the one or more processors, the electronic device is in a folded state, the first screen of the electronic device is on, and the second screen of the electronic device is off; the memory is configured to store one or more programs that, when executed by the one or more processors, cause the electronic device to perform operations comprising:
    determining a first use posture of using the electronic device is performed by a user, and locking the first screen in response to the determination of the first use posture being performed; and
    upon detecting a photographing scenario of a camera and a flip operation performed by the user of the electronic device, detecting whether an object approaches the electronic device, and in response to a result of detecting whether an object approaches the electronic device, switching from performing displaying merely on the first screen to performing displaying merely on the second screen, or maintaining the first screen on and the second screen off, wherein in response to a result of detecting whether an object approaches the electronic device, switching from performing displaying merely on the first screen to performing displaying merely on the second screen, or maintaining the first screen on and the second screen off comprises:

upon detecting that an object approaches the electronic device, maintaining the first screen on and the second screen off, and upon detecting that no object approaches the electronic device, and when the first screen is not locked, switching from performing displaying merely on the first screen to performing displaying merely on the second screen.

10. The electronic device according to claim 9, wherein the electronic device is in a selfie scenario when a flip angle of the electronic device is greater than a flip threshold and no object approaches the electronic device.

11. The electronic device according to claim 9, wherein the electronic device is in a code scanning scenario when a flip angle of the electronic device is greater than a flip threshold and an object approaches the electronic device.

12. A non-transitory computer readable storage medium, storing computer instructions that, when executed by an electronic device, cause the electronic device to perform operations comprising:

determining whether a first use posture of using the electronic device is performed by a user, and locking a first screen of the electronic device in response to the determination of the first use posture being performed, wherein the electronic device is in a folded state, the first screen of the electronic device is on, and a second screen of the electronic device is off; and upon detecting a photographing scenario of a camera of the electronic device and a flip operation performed by the user of the electronic device, detecting whether an object approaches the electronic device, and in response to a result of detecting whether an object approaches the electronic device, switching from performing displaying on the first screen to performing displaying on a second screen, or maintaining the first screen on and the second screen off, wherein in response to a result of detecting whether an object approaches the electronic device, switching from performing displaying merely on the first screen to performing displaying merely on the second screen, or maintaining the first screen on and the second screen off comprises:

upon detecting that an object approaches the electronic device, maintaining the first screen on and the second screen off, and upon detecting that no object approaches the electronic device and when the first screen is not locked, switching from performing displaying merely on the first screen to performing displaying merely on the second screen.

13. A computer program product embodied on a non-transitory computer readable medium for controlling display of an electronic device, comprising:

computer code for determining whether a first use posture of using the electronic device is performed by a user, and locking a first screen of the electronic device in response to the determination of the first use posture being performed, wherein the electronic device is in a folded state, the first screen of the electronic device is on, and a second screen of the electronic device is off; and computer code for, upon detecting a photographing scenario of a camera of the electronic device and a flip operation performed by the user of the electronic device, detecting whether an object approaches the electronic device, and in response to a result of detecting whether an object approaches the electronic device, switching from performing displaying on the first screen to performing displaying on a second screen, or maintaining the first screen on and the second screen off, wherein in response to a result of detecting whether an object approaches the electronic device, switching from performing displaying merely on the first screen to performing displaying merely on the second screen, or maintaining the first screen on and the second screen off comprises:

upon detecting that an object approaches the electronic device, maintaining the first screen on and the second screen off, and upon detecting that no object approaches the electronic device, and when the first screen is not locked, switching from performing displaying merely on the first screen to performing displaying merely on the second screen.

* * * * *